Jan. 5, 1926.　　　　　　　　　　　　　　　1,568,493
G. ALLEN
COMBINED TOBOGGAN AND SLED
Filed Jan. 17, 1925　　2 Sheets-Sheet 1
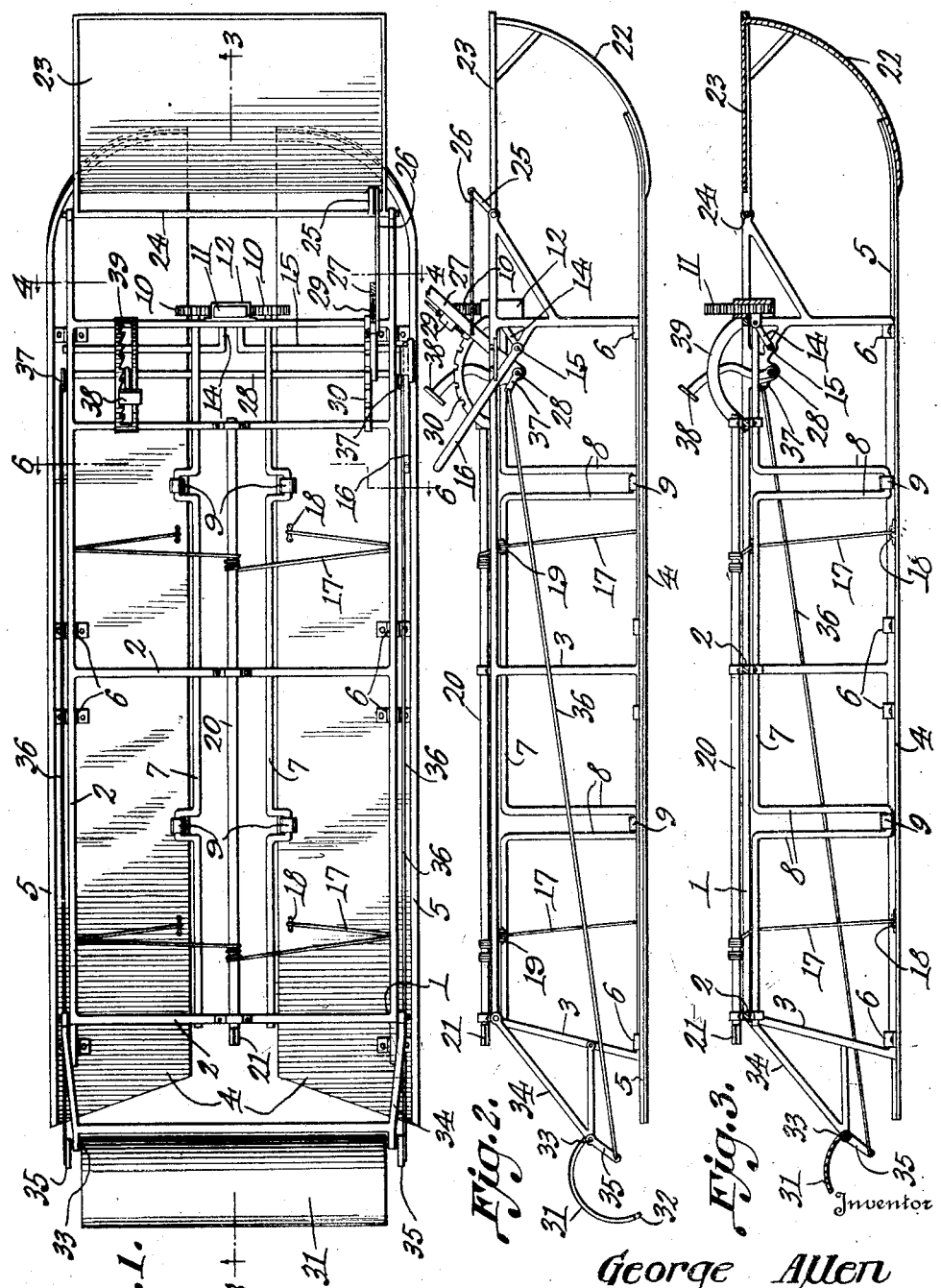
Inventor
George Allen
By C.A.Snow&Co
Attorneys Jan. 5, 1926.  
G. ALLEN  
1,568,493  
COMBINED TOBOGGAN AND SLED  
Filed Jan. 17, 1925  2 Sheets-Sheet 2
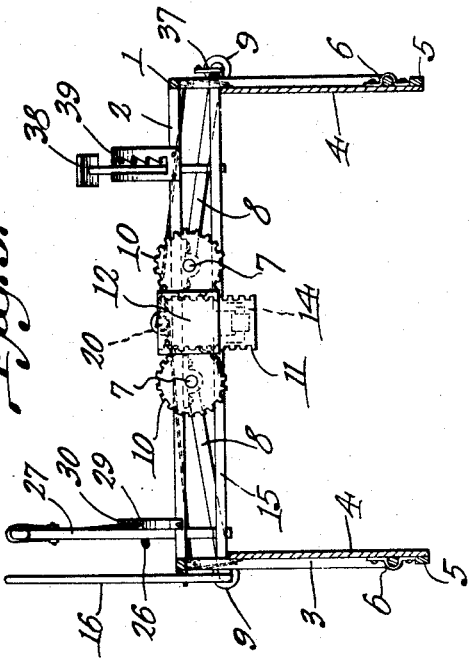
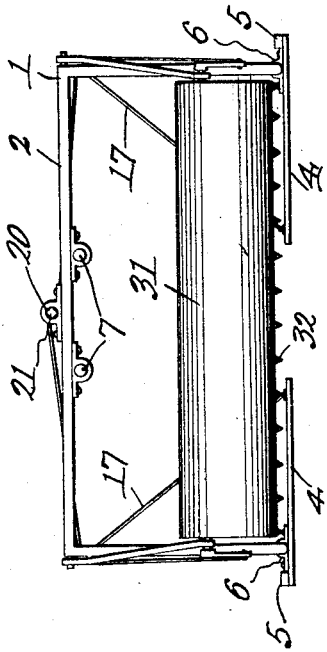
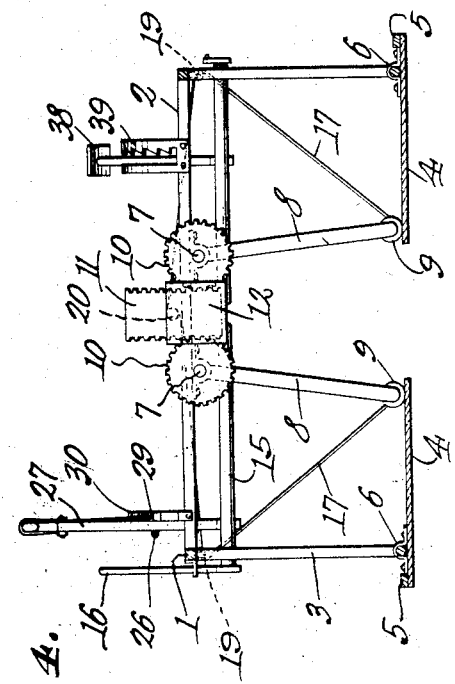
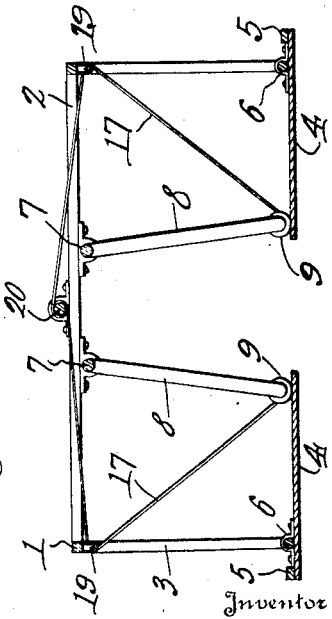
Inventor  
George Allen  
By C. A. Snow & Co.  
Attorneys Patented Jan. 5, 1926.

1,568,493

UNITED STATES PATENT OFFICE.

GEORGE ALLEN, OF HILLMAN, MINNESOTA.

COMBINED TOBOGGAN AND SLED.

Application filed January 17, 1925. Serial No. 3,164.

*To all whom it may concern:*

Be it known that I, GEORGE ALLEN, a citizen of the United States, residing at Hillman, in the county of Morrison and State of Minnesota, have invented a new and useful Combined Toboggan and Sled, of which the following is a specification.

Among those who live in climates where there is much snow, it is a matter of common knowledge that when the snow is well packed down, an ordinary sled, the runners of which lie in vertical planes, is the proper vehicle to use, because the runners offer little resistance to the forward movement of the sled. In deep snow, however runners of the sort alluded to cut in too deeply, and a sled cannot be used. A vehicle having horizontally extended runners, like the surface of a toboggan, will operate in a satisfactory way when the snow is deep or soft, but such a vehicle offers considerable resistance to the forward movement.

From the foregoing it will be obvious that at times it is desirable to use a sled, and at other times to use a vehicle of the toboggan type, and this invention aims to provide a vehicle which is convertible, at the will of an operator, from sled to toboggan, and from toboggan to sled.

It is within the province of the disclosure to improve generally and to enhance the utility of devices of that type to which the invention appertains.

Although a preferred form of the invention has been shown, it will be understood that a mechanic, working within the scope of what is claimed, may make such alterations as his skill may suggest, without departing from the spirit of the invention.

In the accompanying drawings:—

Figure 1 shows in top plan, a device constructed in accordance with the invention; Figure 2 is a side elevation; Figure 3 is a longitudinal section; Figure 4 is a section on the line 4—4 of Figure 1; Figure 5 is a section similar to Figure 4, but showing the runners raised from the toboggan position of Figure 4 to a sled position; Figure 6 is a section on the line 6—6 of Figure 1; Figure 7 is a rear end elevation.

In carrying out the invention, there is provided a frame 1 including a top 2 and depending sides 3. Runners 4 are supplied and are of unequal transverse dimensions, the runners being, in point of fact, in the form of elongated plates, of so much width that when they are horizontally disposed, as in Figure 4, the vehicle will pass readily over soft snow; the thickness of the runners 4 being so little that when the runners are vertically disposed, as in Figure 5, the vehicle will run readily over a roadway in which the snow is well packed, without offering any more resistance than occurs in the operation of a common sled. Those edges of the runners 4 which are presented to the snow when the runners stand vertically, carry reinforcing strips or shoes 5. The runners are supplied, near to their outer edges with bearings 6 whereby the runners are pivotally mounted on the lower members of the sides 3 of the frame, for swinging movement between the positions delineated in Figures 4 and 5.

The major portions of the runners 4 lie within the contour of the frame 1, as disclosed in Figure 4. In order to hold the runners 4 in the horizontal position disclosed in the figure mentioned, a bracing means is provided. The bracing means includes a pair of parallel shafts 7, extended longitudinally of the vehicle and journaled on the upper portion of the frame 1, the shafts having loop-shaped crank arms 8, whereon rollers 9 are rotatable. It is clear that when the arms 8 are in the positions shown in Figures 4 and 6, the rollers 9 bearing on the runners 4 near to the inner edges thereof, the runners will be sustained against upward swinging movement. In order to operate the shafts 7 and to hold the crank arms or braces 8 in the position depicted in Figure 4, the shafts 7 are supplied at their forward ends with pinions 10 meshing into a rack bar 11 which is vertically slidable in a guide 12 supported on the frame 1. The rack bar 11 is engaged with a crank 14 on a shaft 15 supported for rotation on the frame 1 and equipped at one end with a handle 16 or other suitable means whereby the shaft may be rotated. When the shaft 15 is rotated through the instrumentality of the handle 16, the crank 14 moves the rack bar 11 vertically in the guide 12, the rack bar rotating the shafts 7 through the instrumentality of the pinions 10; it being possible, thus, for an operator to swing the crank arms 8 from the brace-forming position of Figure 6 to the inoperative position of Figure 5.

Having provided a means whereby the brace-cranks 8 may be rendered inoperative, the invention proposes a means whereby the runners 4 may be turned up from the horizontal or toboggan position of Figure 4 to the vertical or sled position of Figure 5. In order to accomplish the result stated, flexible elements 17 are connected at 18 to the runners 4, near the inner edges of the runners. The flexible elements 18 extend outwardly and upwardly, about pulleys 19, or other guides, on the upper portion of the frame 1 and at the sides thereof. From the pulleys 19, the flexible elements 17 are carried inwardly, and are wound about a shaft 20 journaled on the frame 1 near to the longitudinal center thereof. The means for rotating the shaft 20 will depend upon whether the sled or toboggan is power-propelled or animal-drawn. Assuming, however, that the shaft 20 is to be rotated by hand, it is provided at its rear end with a squared portion 21, adapted to receive a crank (not shown). When rotation is imparted to the shaft 20, the flexible elements 17 will be wound on the shaft, the runners being swung from the horizontal position of Figure 6 to the vertical position of Figure 5.

In order to prevent the forward ends of the runners 4 from digging into the deep snow when the runners are in the toboggan position of Figures 4 and 6, the device is caused to include a curved plate-like prow 22, adapted to extend beneath the forward ends of the runners, as best shown in Figures 2 and 3. The prow is carried by an arm 23, in the shape of a platform secured to a shaft 24 mounted to rock in the forward end of the frame 1. The shaft 24 has a crank arm 25 united by a connection 26 with a lever 27 mounted to swing on a shaft 28 hereinafter described more fully, or otherwise fulcrumed, the lever 27 having a latch mechanism 29 adapted to cooperate with a segment 30 on the frame 1. Through the medium of the lever 27, the connection 26, the crank arm 25, the shaft 24, and the member 23, the prow 22 may be lowered to cooperate with the runners, when the runners are in the toboggan position shown in Figure 2, it being possible to swing the prow 22 up and out of the way, when the runners are disposed vertically, as shown in Figure 5.

A brake mechanism is provided, the same including a curved member 31 equipped at its lower edge with teeth 32, the said member being carried by a shaft 33 mounted to rock in an extension 34 forming part of the frame 1. At its ends, the shaft 33 has crank arms 35 united by connections 36 with crank arms 37 on the shaft 28, hereinbefore mentioned incidentally, the shaft 28 being mounted to rock in the side portions of the frame 1, and being equipped with a pedal 38 or other operating means, the frame carrying a rack 39 wherewith the pedal 38 may be engaged. By way of the pedal 38, the shaft 28, the arms 37, the connections 36, the arms 35 and the shaft 33, the brake member 31 may be swung downwardly so that it will scoop into the snow, or claw into the ice with its teeth 32, thereby impeding the advance of the vehicle.

The operation of the device has been dealt with hereinbefore, step by step, in connection with the various component mechanisms. By way of résumé, however, it is pointed out that the lever or handle 16 and associated parts constitute means whereby the braces 8 may be swung upwardly out of engagement with the toboggan runners 4. The shaft 20 and complemental parts are used to swing the members 4 up into the sled runner position of Figure 5. The lever 27 and allied parts afford means whereby the prow 22 may be manipulated, as and for the purpose hereinbefore set forth, and, through the instrumentality of the pedal 38 and its connections, the brake member 31 may be rendered operative or inoperative.

Having thus described the invention, what is claimed is:—

1. In a device of the class described, a frame, runners of unequal transverse dimensions, and means for pivoting the runners to the frame to permit the runners to lie horizontally, or stand vertically, thereby enabling the device to be used as a toboggan or as a sled, at the will of an operator.

2. A device of the class described constructed as set forth in claim 1, and further characterized by the provision of a prow pivoted to the frame and cooperating with the runners, when the runners lie horizontally, to prevent the forward ends of the runners from digging into the snow.

3. A device of the class described, constructed as set forth in claim 1, and further characterized by the provision of a prow pivoted to the frame and cooperating with the runners, when the runners lie horizontally, to prevent the forward ends of the runners from digging into the snow; and means under the control of an occupant of the device for moving the prow to and from operative position with respect to the runners.

4. A device of the class described, constructed as set forth in claim 1, and further characterized by the provision of means for moving the runners to cause them to assume horizontal and vertical positions.

5. A device of the class described, constructed as set forth in claim 1, and further characterized by the provision of braces mounted to swing on the frame and cooperating with the runners, when the runners lie horizontally, and mechanism for operating all of the braces from a single point of force-application.

6. A device of the class described, constructed as set forth in claim 1, and further characterized by the provision of a brace mechanism on the frame and effectively under the control of an operator the brace mechanism cooperating with the runners when the runners lie horizontally and when they stand vertically.

7. A device of the class described, constructed as set forth in claim 1, and further characterized by the provision of braces mounted to swing on the frame and cooperating with the runners when the runners lie horizontally; and a prow pivoted to the frame and cooperating with the runners, when the runners lie horizontally, to prevent the runners from digging into the snow at their forward ends.

8. In a device of the class described, a frame, runners of unequal transverse dimensions, means for pivoting the runners to the frame to permit the runners to lie horizontally or stand vertically, thereby enabling the device to be used as a toboggan or as a sled, at the will of an operator, means under the control of an operator for moving the runners to cause them to assume horizontal and vertical positions; braces mounted to swing on the frame and cooperating with the runners when the runners lie horizontally, mechanism for operating all of the braces from a single point of force-application; a prow pivoted to the frame and cooperating with the runners, when the runners lie horizontally, to prevent the runners from digging into the snow, and means under the control of an occupant of the device for moving the prow to and from operative position with respect to the runners.

In testimony that I claim the foregoing as my own, I have hereto affixed my signature.

GEORGE ALLEN.